(12) United States Patent
Kreuzer

(10) Patent No.: US 6,454,486 B2
(45) Date of Patent: Sep. 24, 2002

(54) DEVICE FOR THE DETACHABLE FASTENING OF A STEERING WHEEL ON A STEERING SHAFT

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 15 days.

(21) Appl. No.: 09/785,725

(22) Filed: Feb. 16, 2001

(30) Foreign Application Priority Data

Mar. 30, 2000 (DE) .......................................... 200 05 884

(51) Int. Cl.[7] .................................................. B62D 1/04
(52) U.S. Cl. ................................. 403/374.3; 403/379.3; 403/24; 74/552; 280/779
(58) Field of Search ...................... 403/1, 374.3, 379.3, 403/325, 373, 355, 24; 74/552; 280/779

(56) References Cited

U.S. PATENT DOCUMENTS

| | | | | |
|---|---|---|---|---|
| 4,383,148 A | * | 5/1983 | Arima et al. ............. | 200/61.54 |
| 4,581,508 A | * | 4/1986 | Shanklin et al. .......... | 200/61.54 |
| 4,676,331 A | * | 6/1987 | Iwaki et al. ................ | 180/79.1 |
| 4,785,144 A | * | 11/1988 | Fosnaugh et al. ......... | 200/61.55 |
| 5,092,628 A | * | 3/1992 | Tamura et al. ............. | 280/731 |
| 5,144,861 A | * | 9/1992 | Nishijima et al. ........... | 74/552 |
| 5,327,989 A | * | 7/1994 | Furuhashi et al. .......... | 180/248 |
| 5,527,068 A | * | 6/1996 | Schneider ................... | 280/775 |
| 5,536,106 A | * | 7/1996 | Landis et al. ............... | 403/374 |
| 5,851,023 A | | 12/1998 | Nagata et al. ............ | 280/728.3 |
| 6,189,647 B1 | * | 2/2001 | Horn, III et al. ............ | 180/287 |
| 6,314,833 B1 | * | 11/2001 | Pillsbury, IV ................ | 74/552 |

FOREIGN PATENT DOCUMENTS

| | | |
|---|---|---|
| DE | 19608213 | 9/1996 |
| DE | 29816568 | 12/1998 |
| DE | 19911930 | 9/1999 |
| JP | 09277897 | 10/1997 |

* cited by examiner

Primary Examiner—Christopher J. Novosad
(74) Attorney, Agent, or Firm—Tarolli, Sundheim, Covell, Tummino & Szabo L.L.P.

(57) ABSTRACT

The invention relates to a device for the detachable fastening of a steering wheel on a steering shaft having an axis. The steering wheel has a hub provided with a through-bore arranged perpendicularly to the axis of the steering shaft and the through-bore intersects a groove arranged in the steering shaft. The device comprises a fastening member arranged in the through-bore. The fastening member has a bolt with a head and a shaft provided at least partially with an external thread and has a nut able to be screwed onto the shaft of the bolt. The nut is able to engage into the groove and the through-bore has two oppositely directed radial support surfaces arranged between the bolt head and the nut. One support surface is arranged on the bolt head side and the other support surface is arranged on the nut side. A spring element is provided which engages one of the bolt and the nut and exerts a force onto one of the bolt and the nut. The force aims for an increase of a distance between the bolt head and the nut.

6 Claims, 1 Drawing Sheet

DEVICE FOR THE DETACHABLE FASTENING OF A STEERING WHEEL ON A STEERING SHAFT

TECHNICAL FIELD

The invention relates to a device for the detachable fastening of a steering wheel on a steering shaft.

BACKGROUND OF THE INVENTION

The use of steering wheels provided with gas bags in automobiles requires new techniques for the installation of the steering wheel on the steering shaft, because the interior of the steering wheel is no longer accessible from above.

It is known for example from the DE 41 06 096, to provide the steering shaft with a groove and to provide the hub with a through-bore which intersects this groove, and in this through-bore to arrange a fastening means consisting of a bolt and a nut screwed onto this bolt, a part of the bolt and/or of the nut engaging into the groove of the steering shaft on tightening of the nut and bolt connection and in this way locking the hub and the steering shaft with each other. As also in the use of nuts screwed from above onto the steering shaft, the torques occurring during traveling are transferred via force-fitting serrations in the steering shaft and the hub.

BRIEF SUMMARY OF THE INVENTION

In order to be able to separate the steering wheel from the steering shaft without difficulty, for example for changing the steering wheel or the gas bag module, it is necessary that the nut and bolt connection can be detached simply and reliably.

This is achieved in a device for the detachable fastening of a steering wheel on a steering shaft having an axis. The steering wheel has a hub provided with a through-bore arranged perpendicularly to the axis of the steering shaft and the through-bore intersects a groove arranged in the steering shaft. The device comprises a fastening means arranged in the through-bore. The fastening means has a bolt with a head and a shaft provided at least partially with an external thread and has a nut able to be screwed onto the shaft of the bolt. The nut is able to engage into the groove and the through-bore has two oppositely directed radial support surfaces arranged between the bolt head and the nut. One support surface is arranged on the bolt head side and the other support surface is arranged on the nut side. A spring element is provided which engages one of the bolt and the nut and exerts a force onto one of the bolt and the nut. The force tries to increase, i.e. aims for an increase of a distance between the bolt head and the nut. The fastening means consisting of bolt and nut forms a nut and bolt connection. On tightening of the nut and bolt connection, the spring element is compressed and pre-stressed. On detaching of the nut and bolt connection, the energy stored in the spring provides for the bolt head and nut to be pressed apart and for the nut to leave the engagement with the groove, so that the steering wheel can be simply removed from the steering shaft.

In a preferred embodiment of the invention, the spring element is arranged between the support surface on the nut side and the nut. In this way, it is ensured that on detachment of the nut and bolt connection the nut moves outwards to the end of the through-bore on the nut side and no longer engages into the groove of the steering shaft.

In a further preferred embodiment of the invention, the spring element is arranged between the support surface on the bolt head side and the bolt head. In this way, the bolt can be easily removed after the detachment of the nut and bolt connection.

It is necessary to secure the nut against rotation in the through-bore, in order to avoid a co-rotation of the nut with the bolt during the tightening movement or during the detachment of the connection.

Advantageously the end of the through-bore on the nut side is secured against the nut falling out, e.g. by caulking.

BRIEF DESCRIPTION OF THE DRAWING

The single FIGURE shows a device according to the invention.

DETAILED DESCRIPTION OF THE PREFERRED EMBODIMENT

Figure 1:
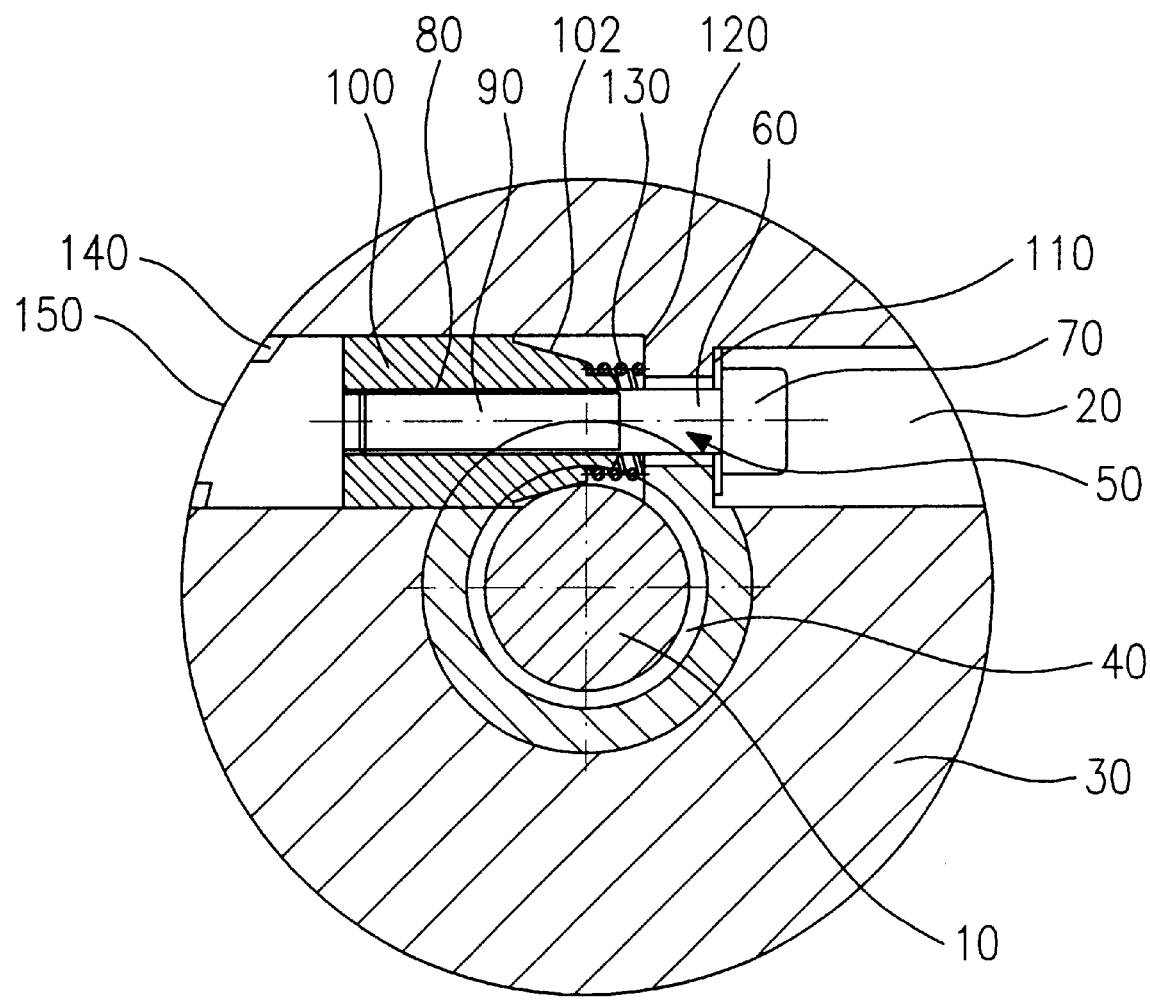

The device shown is used for the detachable fastening of a steering wheel on a steering shaft 10, the steering wheel having a hub 30 which is provided with a through-bore 20. This through-bore 20 intersects a groove 40 formed in the steering shaft. In the through-bore 20 a constriction is constructed, which forms two radial support faces 110 and 120.

An essential component of the device is a fastening means 50. This fastening means 50 has a bolt 60 with a bolt head 70 and also a shaft 90, which is provided at least partially with an external thread 80, and has a nut 100 which is able to be screwed onto the shaft 90 and is arranged in the through-bore 20 such that the bolt head 70 and the nut 100 are separated from each other by the radial support surfaces 110 and 120. The support surface 110 here faces the bolt head 70 and the support surface 120 faces the nut 100. The nut 100 is provided with an internal thread and has at its end facing the support surface 120 on the nut side a preferably conical chamfer 102 which is constructed such that it can engage into the groove 40 of the steering shaft 10.

In the through-bore 20 a guide is provided for the nut 100 in order to secure it against rotation in the through-bore 20 and to prevent a co-rotation of the nut with the bolt movement during a screwing procedure.

Between the nut 100 and the support surface 120 on the nut side a spring element 130 is arranged, preferably a spiral spring. Between the support surface 110 on the bolt head side and the bolt head 70, a washer can be provided.

In order to prevent the nut 100 from falling out from the through-bore 20 with a detached nut and bolt connection 50, the end of the through-bore 20 on the nut side is secured by suitable means, e.g. by caulking 140.

To connect the steering wheel with the steering shaft, with a detached nut and bolt connection 50, the steering wheel is placed onto the steering shaft. Serrations (not illustrated) in hub and steering shaft provide for a torque transmission between the steering wheel and the steering shaft. The nut 100 is only screwed onto the shaft 90 so far that the spring element 130 holds the nut 100 by elastic force in a position close to the opening 150 of the through-bore 20 on the nut side, so that the nut 100 does not prevent the placing of the steering wheel 30 onto the steering shaft 10.

After placing the steering wheel onto the steering shaft, therefore firstly the conical chamfer 102 of the nut 100 does not engage into the groove 40 of the steering shaft 10. By a tightening of the nut and bolt connection by rotation of the bolt head 70, the nut 100 is moved along its guide toward the support surface 120 and in so doing arrives in engagement with the groove 40 and via the conical chamfer 102 locks the hub 30 of the steering wheel with the steering shaft 10. The support surfaces 110 and 120 provide for the nut to assume a defined position with respect to the groove 40. After the tightening of the nut and bolt connection 50, the steering wheel is secured on the steering shaft.

The spring element 130 is compressed and prestressed by the movement of the nut 100 in the direction of the support surface 120.

To detach the connection between the hub 30 of the steering wheel and the steering shaft 10, the nut and bolt connection 50 is detached, in turn by rotating of the bolt head 70. The spring element 130 gradually relaxes and moves the nut 100 from the support surface 120 away toward the opening 150 on the nut side with the bolt head 70 as before lying against the support surface 110. In this way, the engagement of the nut 100 with the groove 70 is reliably released and the steering wheel can be lifted from the steering shaft.

What is claimed is:

1. A device for the detachable fastening of a steering wheel on a steering shaft having an axis, said steering wheel having a hub provided with a through-bore arranged perpendicularly to said axis of said steering shaft, and said through-bore intersecting a groove arranged in said steering shaft, said device comprising a fastening means arranged in said through-bore, said fastening means having a bolt with a head and a shaft provided at least partially with an external thread and having a nut able to be screwed onto said shaft of said bolt, said nut being able to engage into said groove, said through-bore having two oppositely directed radial support surfaces arranged between said bolt head and said nut, one support surface being arranged on the bolt head side and said other support surface being arranged on the nut side, and a spring element being provided which engages one of said bolt and said nut and exerts a force onto one of said bolt and said nut, said force aiming for an increase of a distance between said bolt head and said nut.

2. The device according to claim 1, wherein said spring element is arranged between said support surface on said nut side and said nut and exerts a force onto said nut in a direction of said bolt head toward said nut.

3. The device according to claim 1, wherein said spring element is arranged between said support surface on said bolt head side and said bolt head.

4. The device according to claim 1, wherein said nut is secured against rotation in said through-bore.

5. The device according to claim 1, wherein said end of said through-bore on said nut side is secured against said nut falling out.

6. The device according to claim 1, wherein said nut has a conical chamfer with which it engages into said groove.

* * * * *